United States Patent
Webber et al.

[11] Patent Number: 6,152,481
[45] Date of Patent: Nov. 28, 2000

[54] SIDE RESTRAINT ASSEMBLY

[75] Inventors: James Lloyd Webber, Shelby Township, Macomb County; Jeffrey Allen Welch, Washington; Bassam Georges Khoudari, Sterling Heights, all of Mich.; Robert D. Messenger, Jr., Mesa, Ariz.; Aron C. Arnold, Phoenix, Ariz.; Greg B. Grace, Mesa, Ariz.

[73] Assignee: Delphi Technologies, Inc., Troy, Mich.

[21] Appl. No.: 09/128,068

[22] Filed: Aug. 3, 1998

[51] Int. Cl.⁷ .................................................. B60R 21/22
[52] U.S. Cl. ...................... 280/730.2; 280/728.2
[58] Field of Search .............................. 280/728.1, 728.2, 280/729, 730.2, 733

[56] References Cited

U.S. PATENT DOCUMENTS

| | | |
|---|---|---|
| H203045 | 8/1998 | Webber et al. . |
| 5,069,480 | 12/1991 | Good .................................... 280/728.2 |
| 5,265,903 | 11/1993 | Kuretake et al. ....................... 280/730 |
| 5,322,322 | 6/1994 | Bark et al. . |
| 5,439,248 | 8/1995 | Steffens, Jr. ......................... 280/730.2 |
| 5,462,308 | 10/1995 | Seki et al. ......................... 280/730.2 X |
| 5,464,246 | 11/1995 | Castro et al. . |
| 5,480,181 | 1/1996 | Bark et al. . |
| 5,588,672 | 12/1996 | Karlow et al. ....................... 280/730.2 |
| 5,618,595 | 4/1997 | Matsushima et al. ........... 280/728.1 X |
| 5,681,055 | 10/1997 | Green et al. ...................... 280/730.2 X |
| 5,791,683 | 8/1998 | Shibata et al. ........................ 280/730.2 |
| 5,829,779 | 11/1998 | Nakashima et al. ................. 280/730.2 |
| 5,853,191 | 12/1998 | Lachat ................................ 280/729 X |
| 5,884,937 | 3/1999 | Yamada ................................ 280/730.2 |
| 5,899,489 | 5/1999 | Jost ...................................... 280/730.2 |
| 5,924,722 | 7/1999 | Koide et al. ......................... 280/730.2 |
| 5,957,487 | 9/1999 | Stutz .................................... 280/730.2 |
| 6,010,149 | 1/2000 | Riedel et al. ....................... 280/730.2 |

FOREIGN PATENT DOCUMENTS

| | | |
|---|---|---|
| 0924122 | 6/1999 | European Pat. Off. . |
| 29605897 | 7/1996 | Germany . |
| 19611575 | 9/1997 | Germany . |
| 19639617 | 4/1998 | Germany . |
| 29802507 | 6/1998 | Germany . |
| 2297950 | 8/1996 | United Kingdom . |
| 2312877 | 11/1997 | United Kingdom . |
| 9419215 | 9/1994 | WIPO . |
| WO 96/26087 | 8/1996 | WIPO . |
| WO 97/43146 | 11/1997 | WIPO . |

*Primary Examiner*—Lanna Mai
*Assistant Examiner*—Lynda Jasmin
*Attorney, Agent, or Firm*—Kathryn A. Marra

[57] ABSTRACT

A restraint assembly includes an inflator for generating inflation gas. The restraint assembly includes an upper cushion portion and an inflatable stiffening device extending generally longitudinally across a lower edge of the cushion portion for providing longitudinal tension and lateral stability to the restraint assembly. Preferably, the stiffening device is tubular. Also preferably, the restraint assembly includes a tensioning device which at least partially surrounds the stiffening device and places longitudinal tension on the stiffening device when inflated. The tensioning device may take the form of a strap or cord that is spiral-wrapped around the stiffening device. The stiffening device preferably includes an inboard stiffening wall and an outboard stiffening wall. The tensioning device may preferably be zig-zag wrapped back and forth across the outboard wall of the stiffening device for preventing occupant interaction with the tensioning device on the inboard side of the stiffening device. For either of the zig-zag or spiral wraps, the stiffening device includes upper and lower edge portions and the tensioning device alternately passes through the upper and lower edge portions.

3 Claims, 12 Drawing Sheets

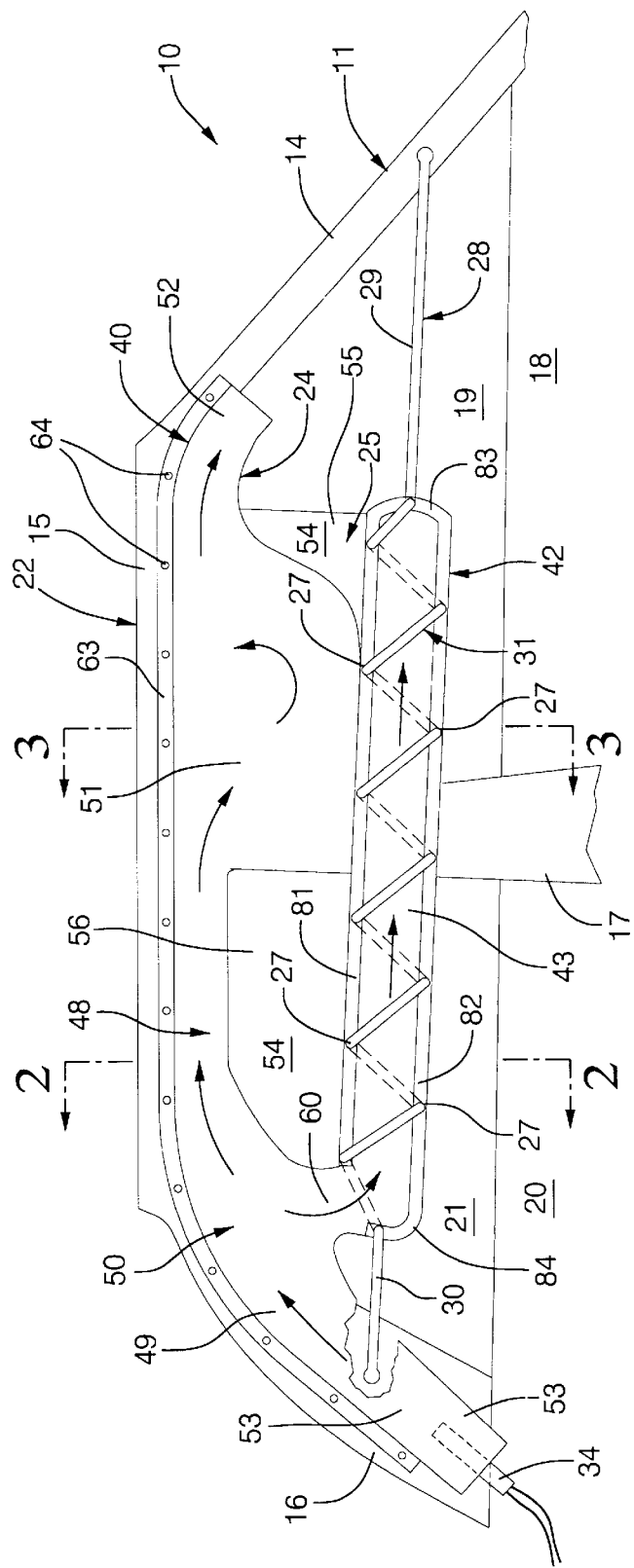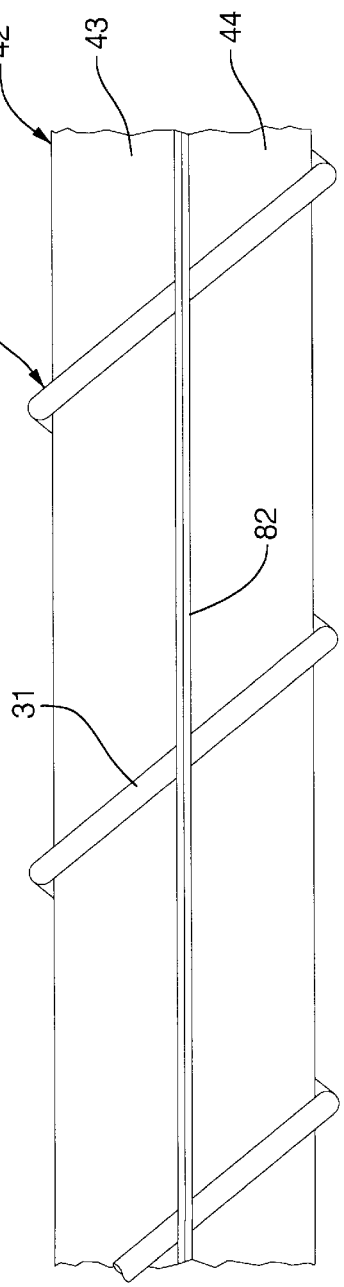
FIG. 1
FIG. 4

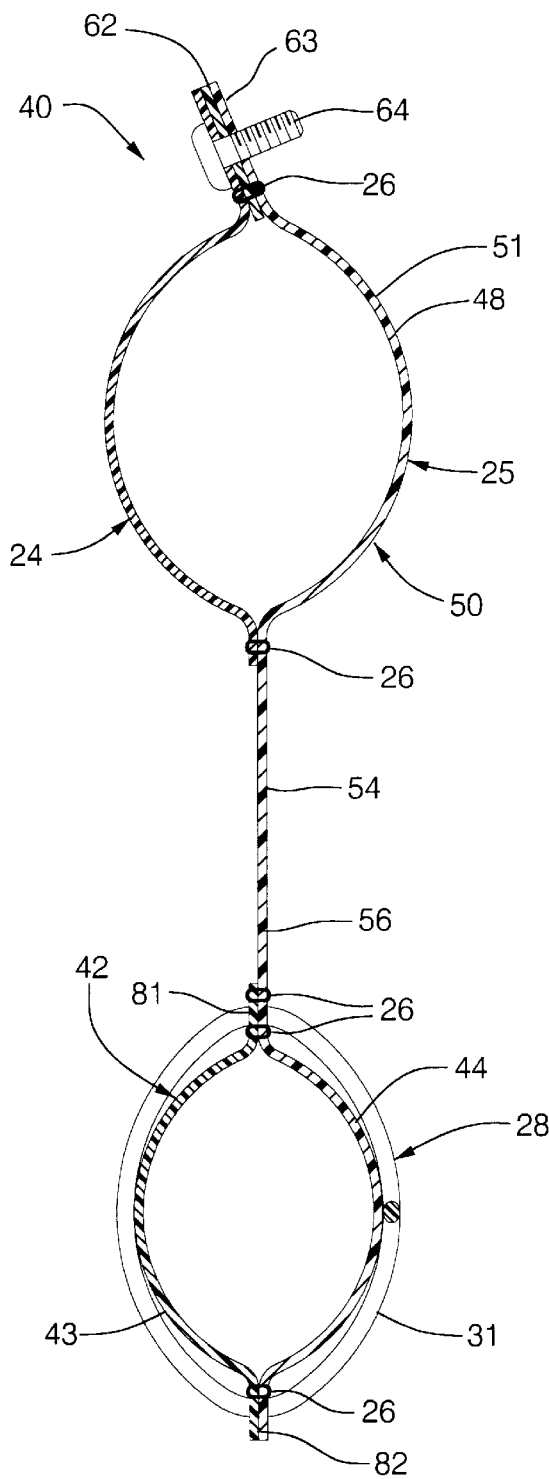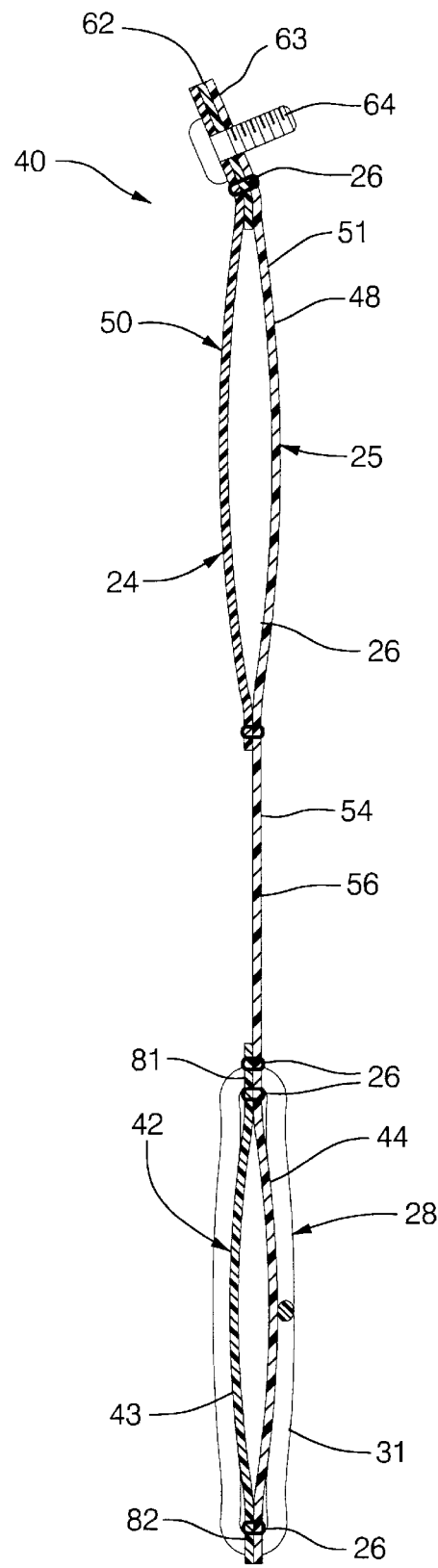
FIG. 2 A
FIG. 2 B

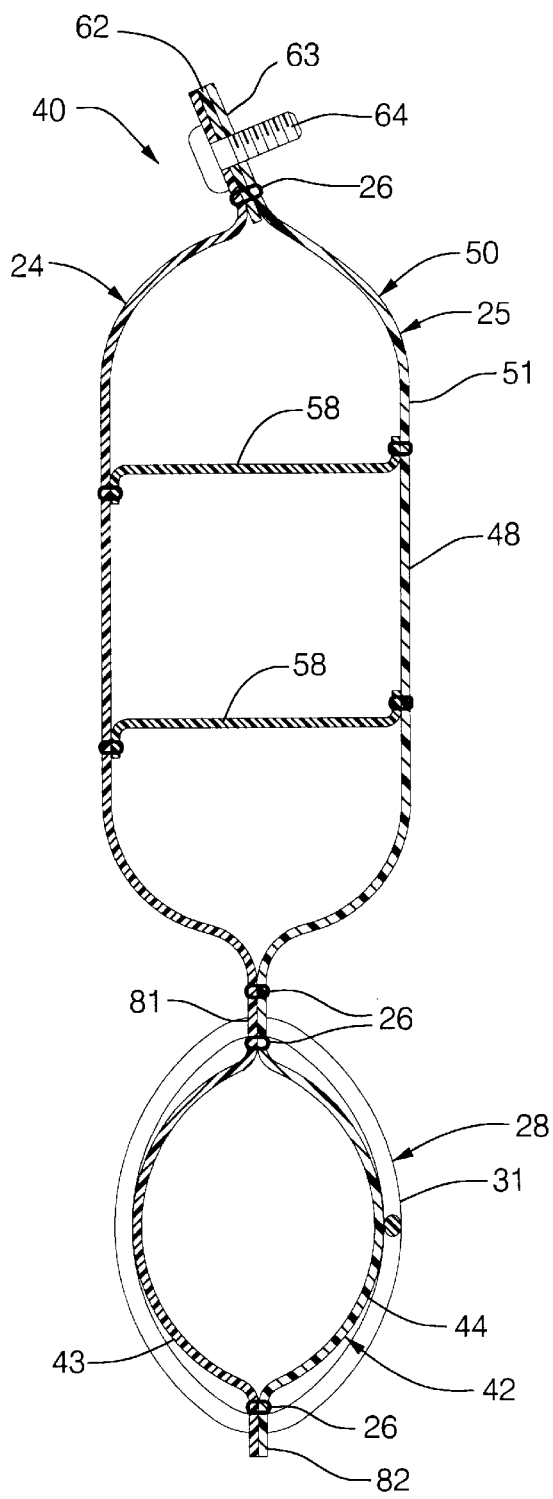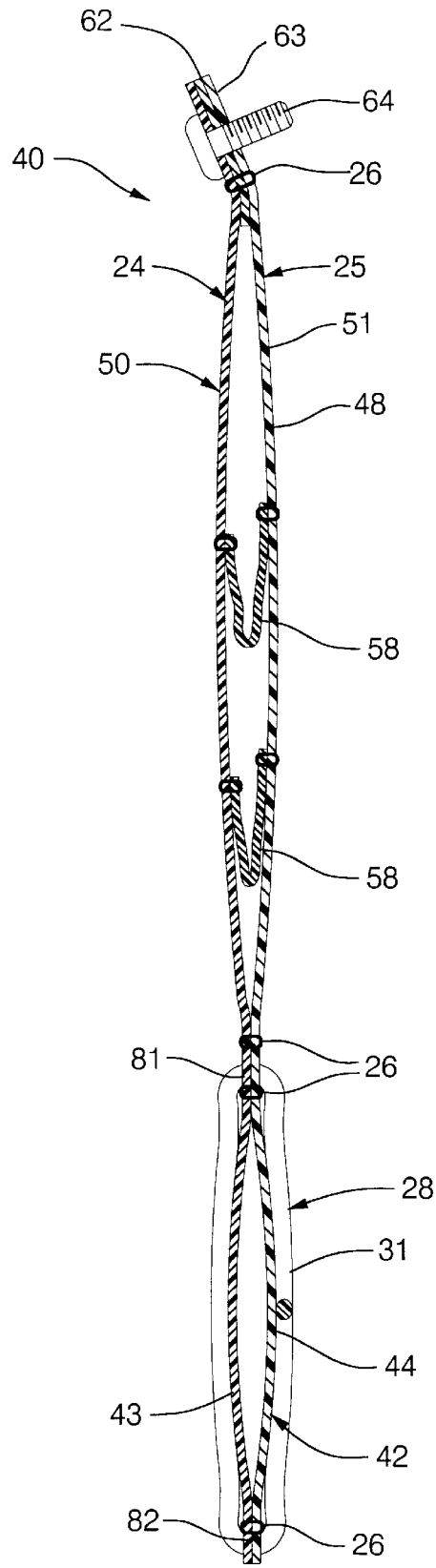
FIG. 3 A
FIG. 3 B

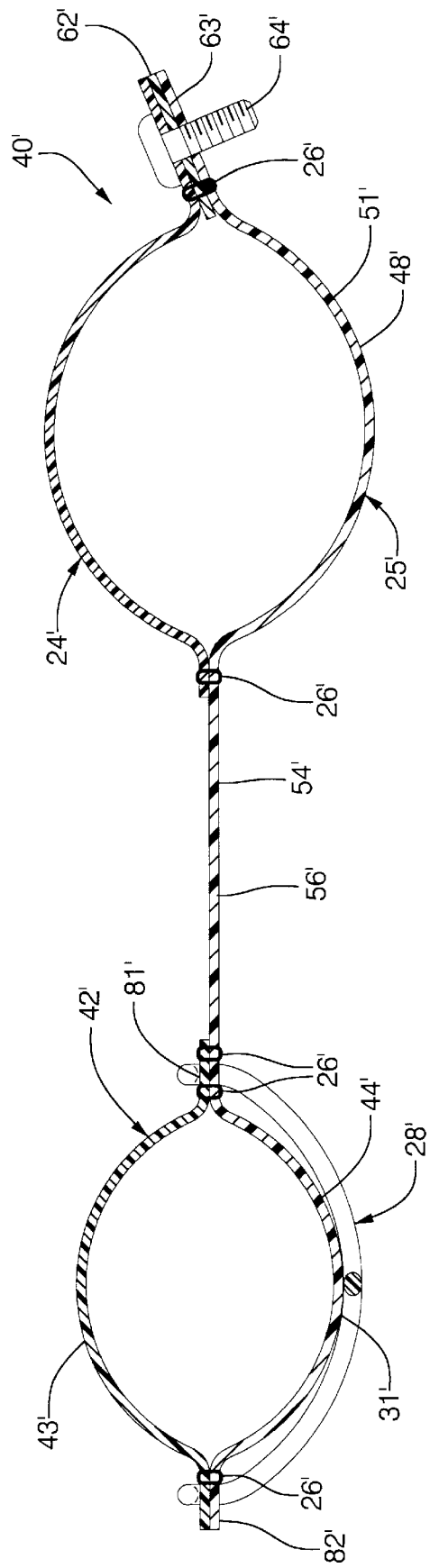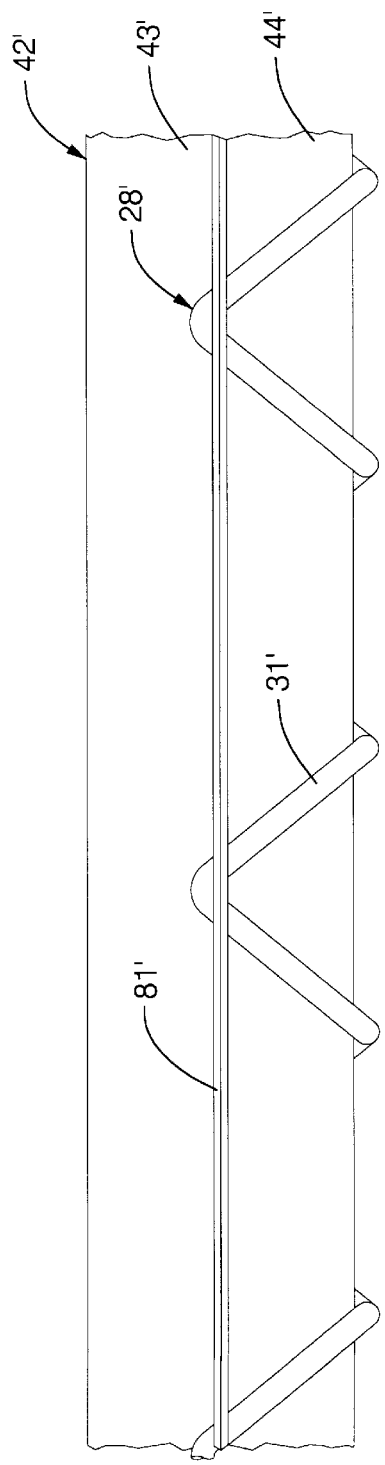
FIG. 6
FIG. 7

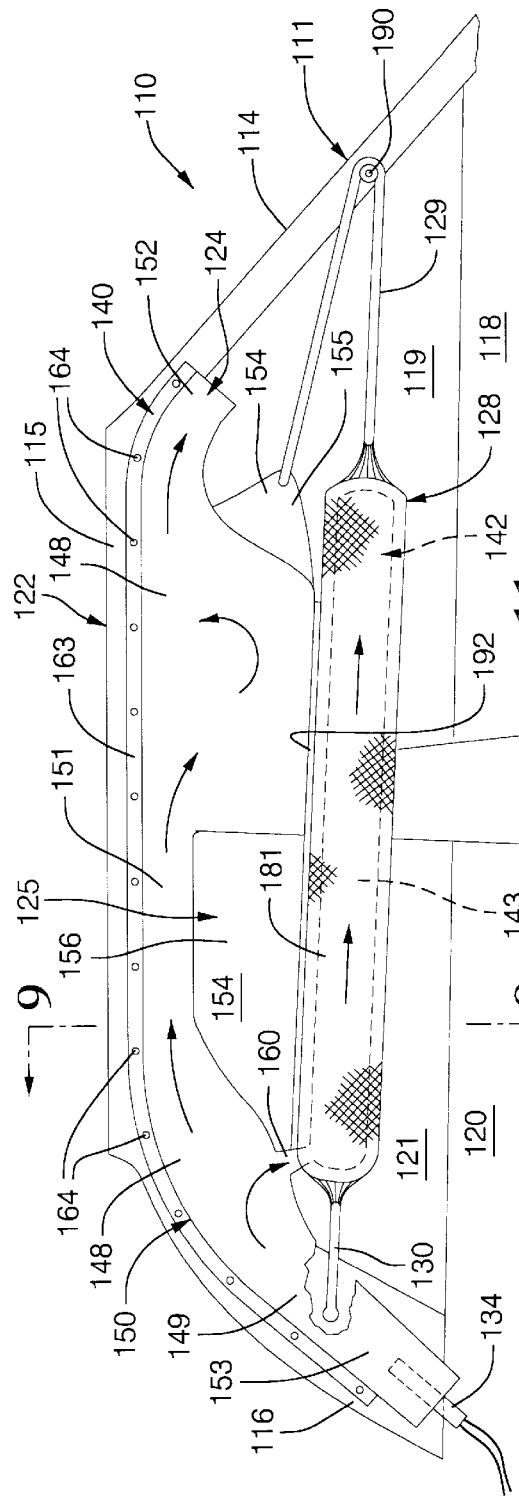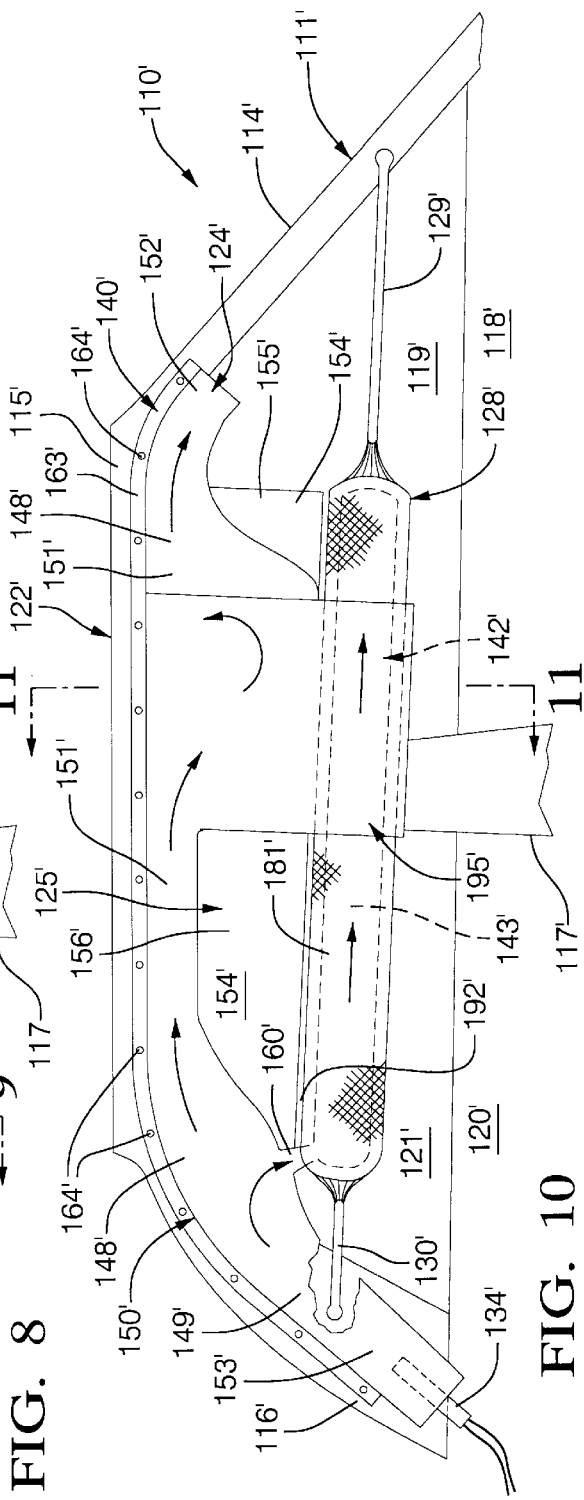

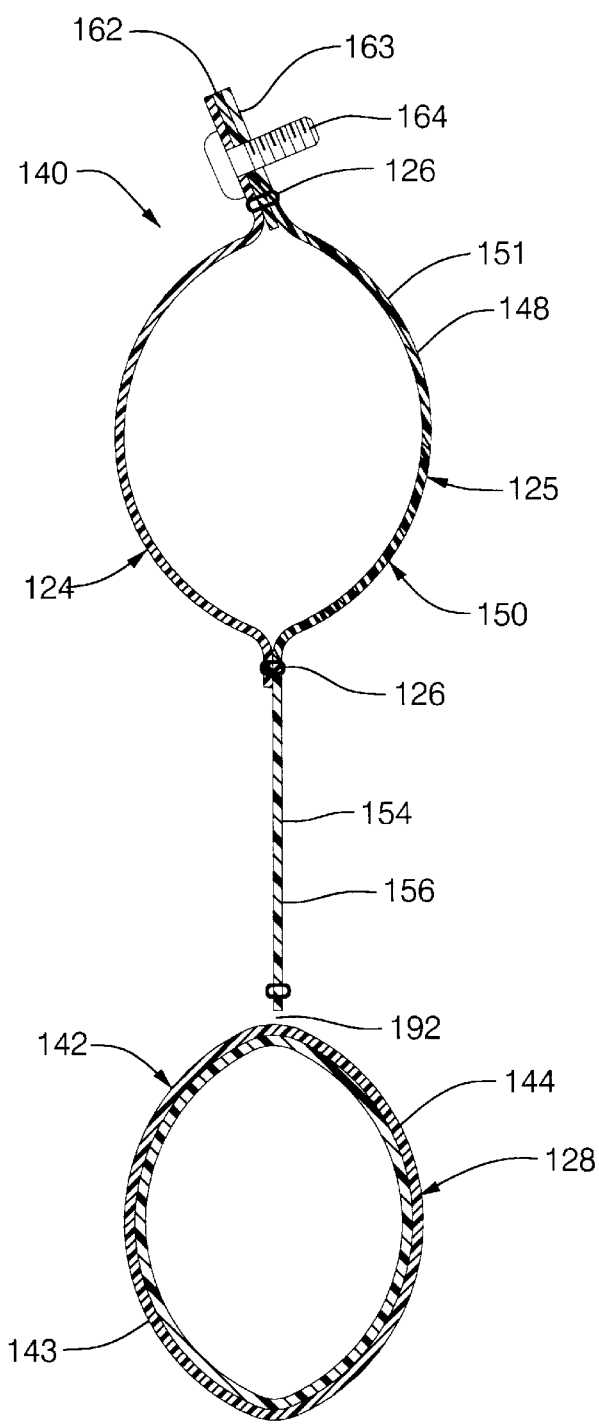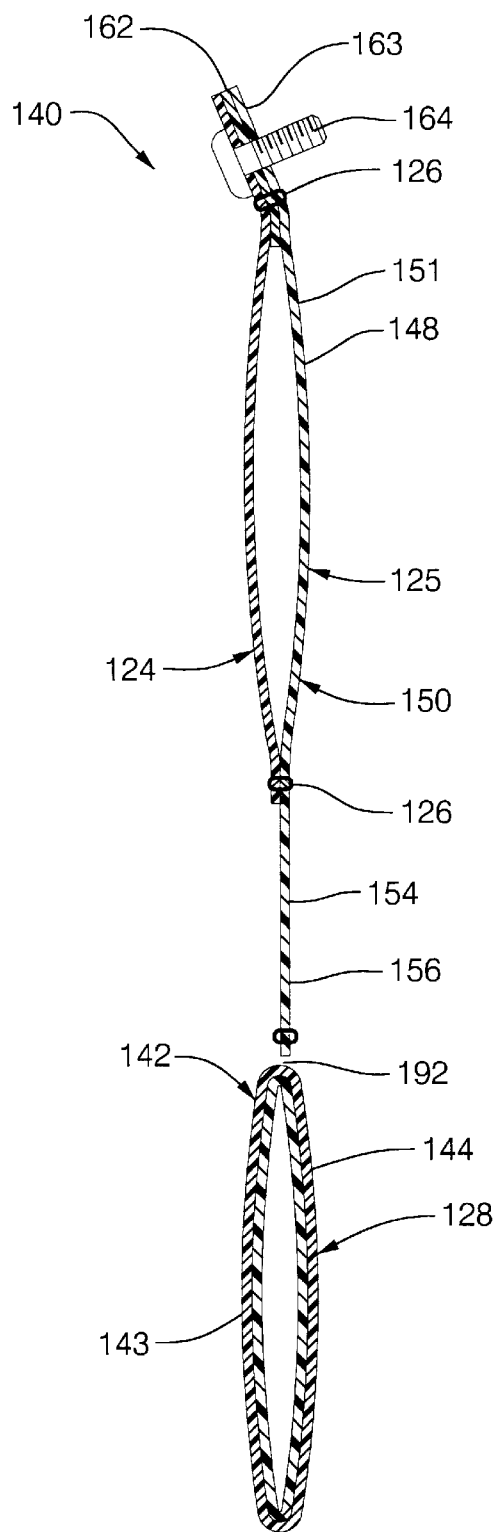
FIG. 9 A　　　　FIG. 9 B

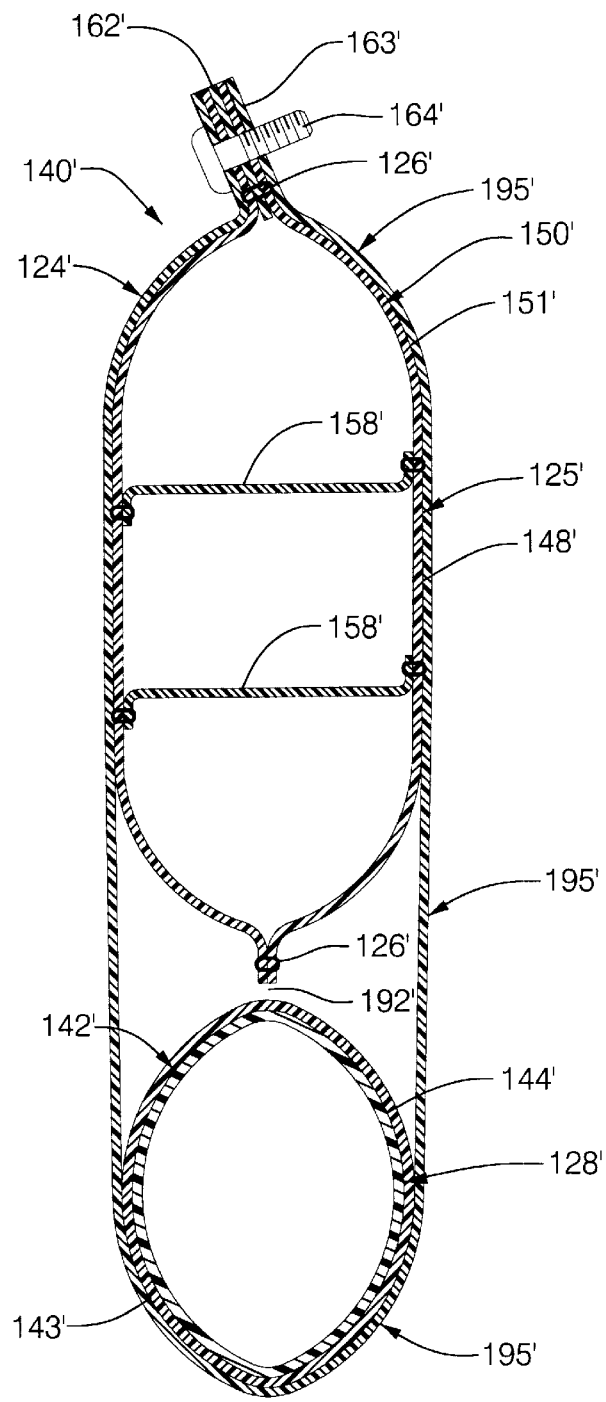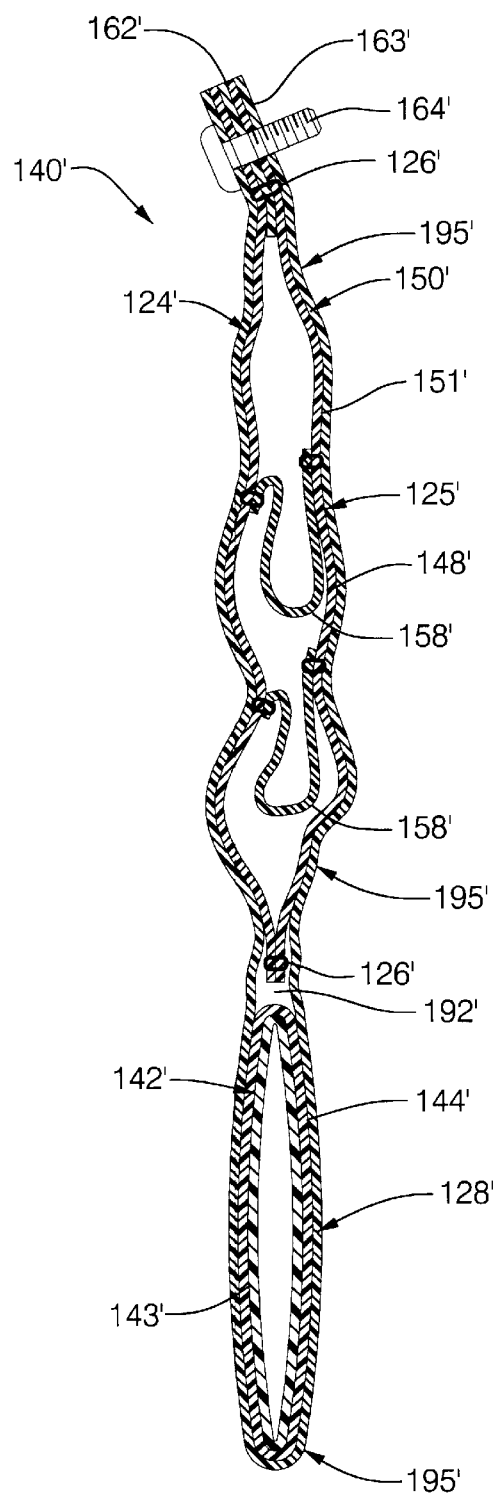
FIG. 11 A  FIG. 11 B

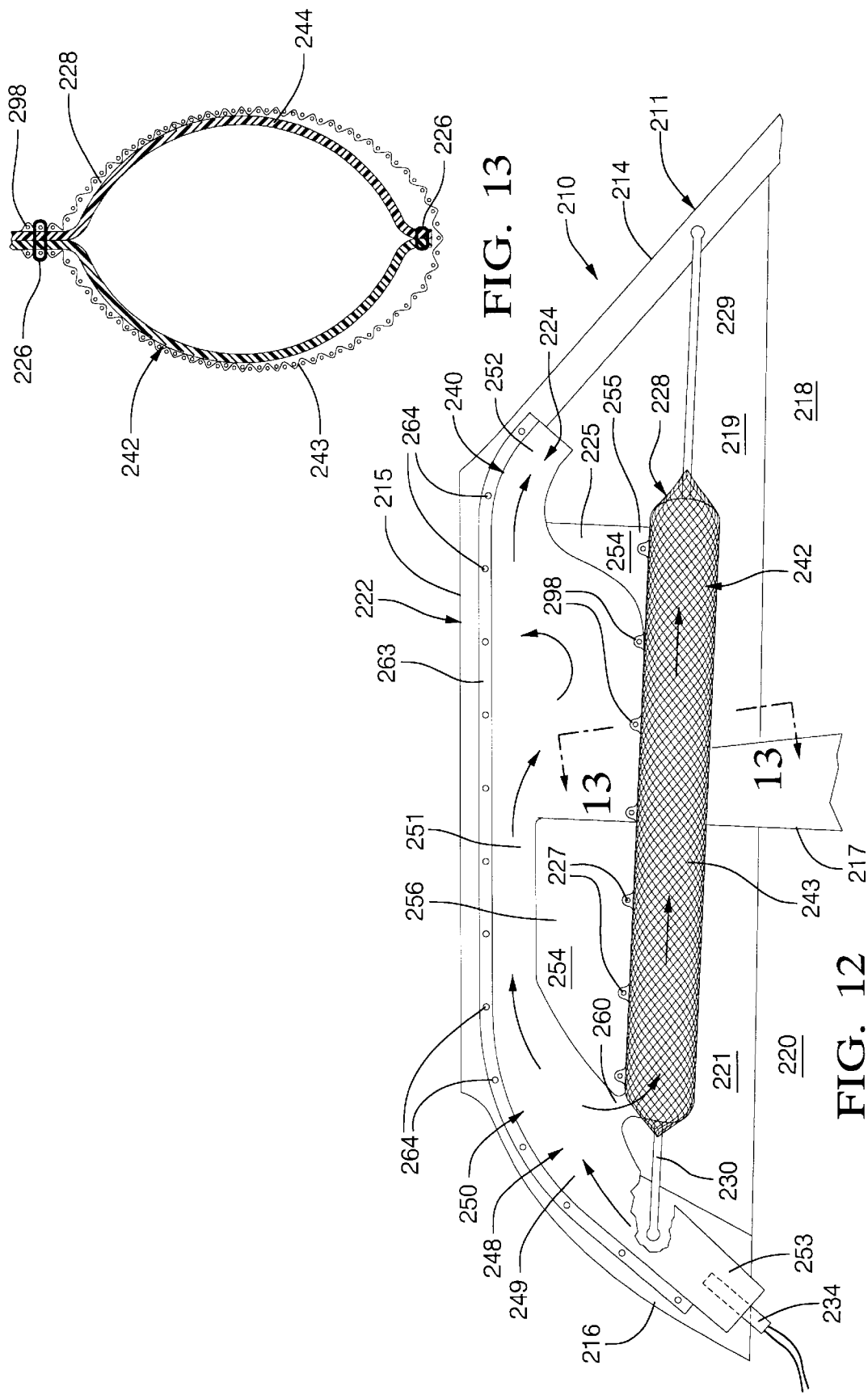

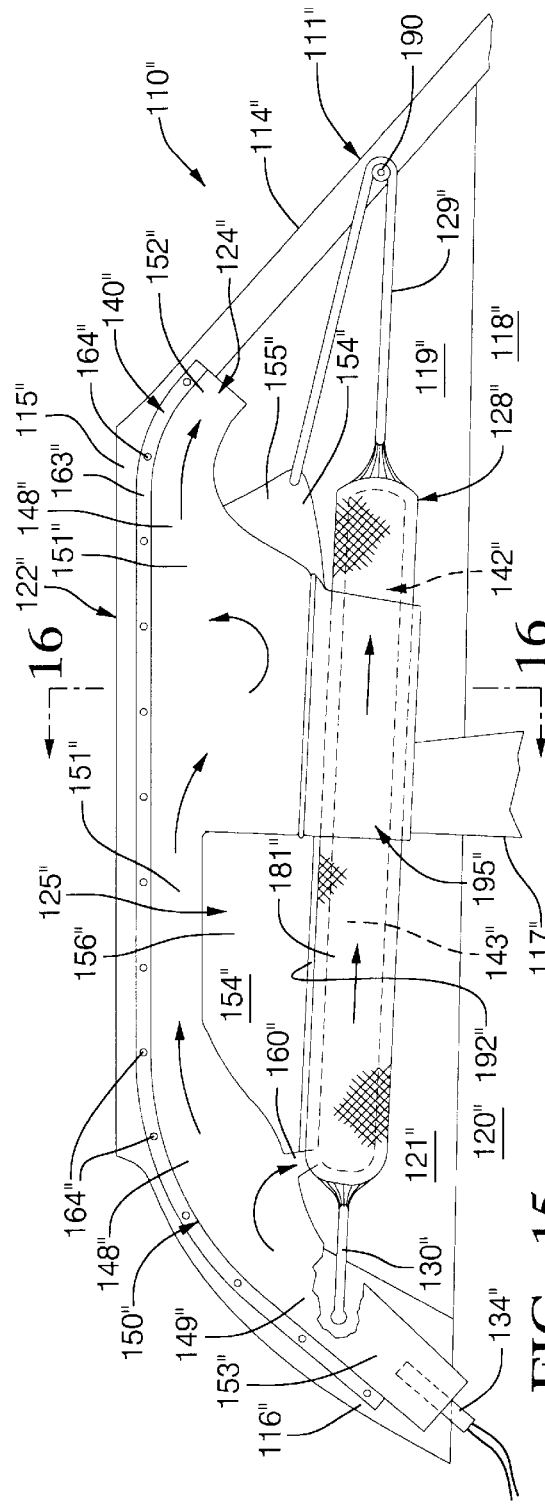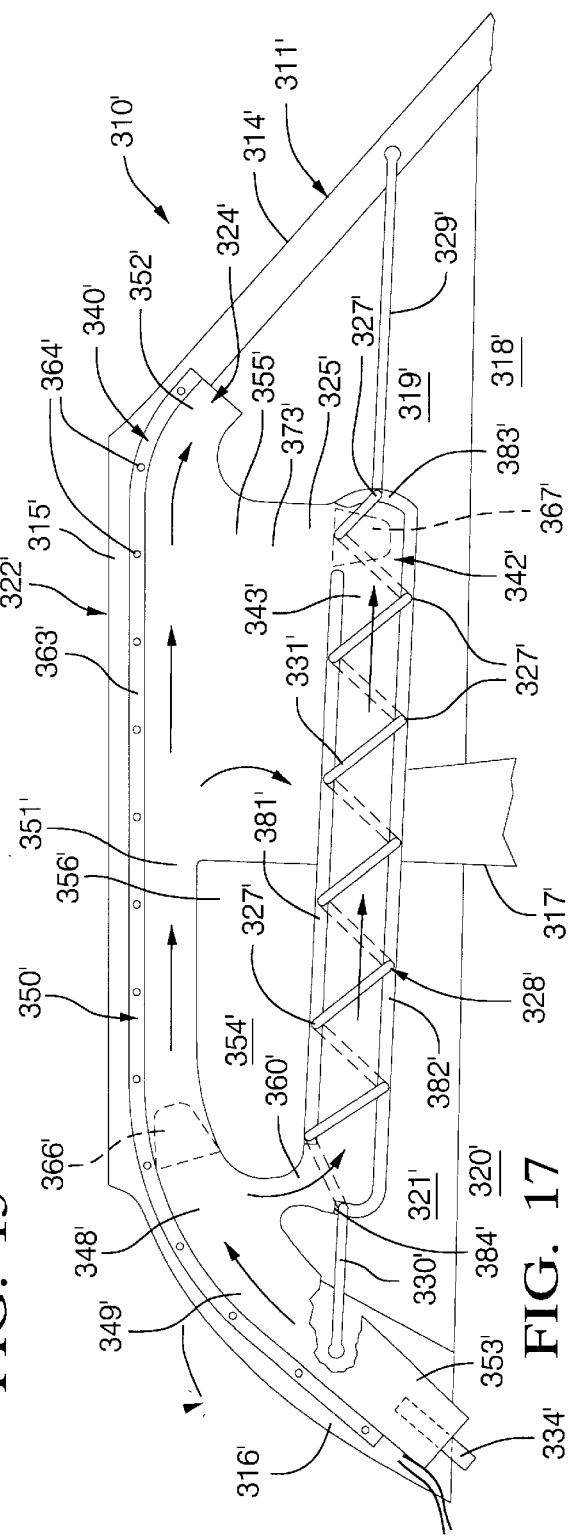

SIDE RESTRAINT ASSEMBLY

TECHNICAL FIELD

This invention relates to a side restraint assembly for protection of vehicle occupants.

BACKGROUND OF THE INVENTION

It is well known in the prior art to provide air bag assemblies which are mounted on the vehicle steering wheel or instrument panels for the protection of vehicle occupants. It is also known to provide various air bag arrangements for protection of vehicle occupants during events in which the occupant interacts with the side of the vehicle. For example, it is known to provide air bags for side impact protection which have an upper head portion and a lower torso portion which simultaneously inflate for protection of a vehicle occupant during a side impact event from the vehicle door or seat.

It is also known to provide inflatable side air bags that deploy from the roof line or pillars of the vehicle to protect generally the head of a vehicle occupant. While these air bags can be designed to provide a large area of coverage, their larger size makes it more challenging to maintain stability of the air bag during occupant interaction. In addition, these arrangements require a substantial amount of inflation gas to quickly fill an inflatable restraint cushion with a relatively large volume for inflation.

It is also known in the prior art to provide longitudinally extending, rigid inflatable tubes that extend across a selected area of the vehicle between the vehicle pillars as shown in U.S. Pat. Nos. 5,480,181 and 5,322,322. While these inflatable tubes maintain a high pressure and provide increased rigidity, multiple independent tubes with multiple connection points to the vehicle body need to be utilized to cover the side of the vehicle.

It has also been suggested to provide a side head air bag with a plurality of vertically extending inflatable cells that include sewn together or tuckered portions between them. A single strap may also be woven in and out between the vertical cells and through the tuckered portions at a central location to provide some lateral support to the plurality of vertical cells. However, the lower edge of the air bag is not restrained. In addition, this arrangement has the shortcoming of the tuckered portions providing a plurality of regular, intermittent, flat vertical spots of noninflatable coverage on the air bag that decreases the amount of consistently inflated coverage available for occupant head protection.

It would be desirable to provide a side air bag that covers a larger area of the side of the vehicle, while increasing the stability and rigidity and while decreasing the amount of inflation gas and fabric cushion material to obtain the coverage.

SUMMARY OF THE INVENTION

The present invention provides alternatives and advantages over the prior art by providing a side restraint assembly for protection of a vehicle occupant that permits sustained inflated coverage of larger portions of the vehicle side structure while maintaining lateral stability. Advantageously, the restraint assembly includes features which enable longitudinal tensioning of the restraint assembly for greater lateral stability. Also advantageously, these objectives may be accomplished while achieving predetermined consistency of the desired inflated coverage area over the vehicle side structure.

These advantages and alternatives are accomplished in a preferred form of the invention by providing a side restraint assembly including an inflator for generating inflation gas. The restraint assembly includes an upper cushion portion and an inflatable stiffening device extending generally longitudinally across a lower edge of the cushion portion for providing longitudinal tension and lateral stability to the restraint assembly. Preferably, the stiffening device is tubular.

Also preferably, the restraint assembly includes a tensioning device which at least partially surrounds the stiffening device and places longitudinal tension on the stiffening device when inflated. The tensioning device may take the form of a strap or cord that is spiral-wrapped around the stiffening device. The stiffening device preferably includes an inboard stiffening wall and an outboard stiffening wall. The tensioning device may preferably be zig-zag wrapped back and forth across the outboard wall of the stiffening device for preventing occupant interaction with the tensioning device on the inboard side of the stiffening device. For either of the zig-zag or spiral wraps, the stiffening device includes upper and lower edge portions and the tensioning device alternately passes through the upper and lower edge portions. The stiffening device is preferably an extension of the same fabric material forming the cushion portion.

In accordance with other embodiments, the tensioning device is a braided tube and the stiffening device is an inflatable bladder positioned inside the tensioning device and completely separate from the cushion portion. The restraint assembly may also include a fabric sleeve that surrounds and supports the stiffening device. The tensioning device could also be a plastic mesh, while the stiffening device is a continuous extension of the cushion portion or a separate bladder.

Also advantageously, the restraint assembly includes seams that are sealed shut, such as by radio frequency welding, for holding inflation gas in the cushion portion and stiffening device for extended periods of time. In addition, the restraint assembly may include a check valve located within the cushion portion or stiffening device for holding inflation pressure in predetermined portions of the cushion portion and stiffening device upon inflation back pressure on the check valve.

BRIEF DESCRIPTION OF THE DRAWINGS

The present invention will now be described, by way of example, with reference to the accompanying drawings, in which:

FIG. 1 is a view of an interior vehicle side structure showing a restraint assembly in an inflated condition;

FIG. 2A is a sectional view taken along line 2—2 of FIG. 1 and showing the restraint assembly in the inflated condition;

FIG. 2B is a sectional view similar to FIG. 2A, but taken when the restraint assembly in a substantially deflated condition;

FIG. 3A is a sectional view taken along line 3—3 of FIG. 1;

FIG. 3B is a sectional view similar to FIG. 3A, but taken when the restraint assembly in the substantially deflated condition;

FIG. 4 is an enlarged partial bottom view of a stiffening device and tensioning device of the restraint assembly;

FIG. 6 is a sectional view taken along line 6—6 of FIG. 5;

FIG. 7 is an enlarged partial bottom view of a stiffening device and tensioning device of FIGS. 5 and 6;

FIG. 8 is a view of an interior vehicle side structure showing another alternate restraint assembly in an inflated condition;

FIG. 9A is a sectional view taken along line 9—9 of FIG. 1;

FIG. 9B is a sectional view similar to FIG. 9A, but showing the restraint assembly in the substantially deflated condition;

FIG. 10 is a view of an interior vehicle side structure showing yet another alternate restraint assembly in an inflated condition;

FIG. 11A is a sectional view taken along line 11—11 of FIG. 10;

FIG. 11B is a sectional view similar to FIG. 11A, but showing the restraint assembly in the substantially deflated condition;

FIG. 12 is a view of an interior vehicle side structure showing still another alternate restraint assembly in an inflated condition;

FIG. 13 is a sectional view taken along line 13—13 of FIG. 12;

FIG. 15 is a view of an interior vehicle side structure showing yet another further alternate restraint assembly in an inflated condition;

FIG. 17 is a view of an interior vehicle side structure showing still another alternate restraint assembly in an inflated condition similar to the configuration shown in FIG. 14, but showing check valves in alternate locations.

DESCRIPTION OF THE PREFERRED EMBODIMENT

Figure 5:
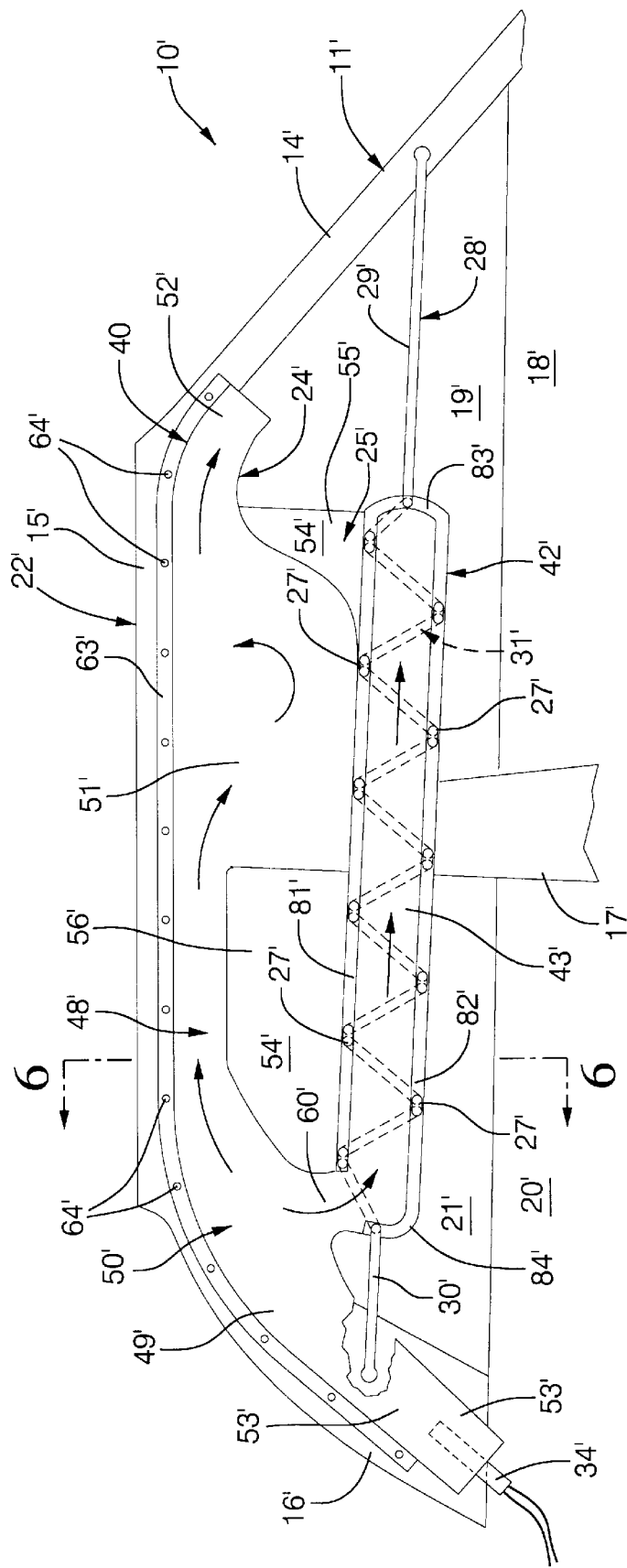
FIG. 5 is a view of an interior vehicle side structure showing a restraint assembly in an inflated condition according to an alternate embodiment of the invention.

Referring to FIG. 1, a vehicle 10 includes a vehicle side portion 11 including a forward A-pillar 14 extending along the side of a vehicle windshield (not shown). The A-pillar 14 extends upward and rearward for intersection with a side roof rail 15 which extends further rearward from the A-pillar 14 along the longitudinal length of the interior vehicle side portion 11 for intersection with a rearward C-pillar 16 which extends downward and rearward from the intersection with the roof rail 15. The interior vehicle side portion 11 further includes a B-pillar 17 which intersects the roof rail 15 at a location spaced between the A-pillar 14 and C-pillar 16. The B-pillar 17 generally provides a side division between a front seating location in the vehicle 10 and a rear seating location. The vehicle 10 includes a front door portion 18 having a movable front side window 19 and a rear door portion 20 having a movable rear side window 21. It will be appreciated that the front and rear side windows 19, 21 are respectively mounted on lower portions of the front and rear door portions 18, 20. The combination of the A-pillar 14, B-pillar 17, C-pillar 16 and side roof rail 15 provide the interior upper vehicle side structure 22. It will further be appreciated that FIG. 1 shows one side portion 11 of the vehicle 10 and that there will be a substantially similar opposite interior vehicle side portion 11 on the opposing lateral side of the vehicle 10.

A side restraint assembly is generally designated as 40. The restraint assembly 40 includes the primary components of an inflator 34, a restraint cushion portion 50, a stiffening device 42, and a tensioning device 28. The cushion portion 50 and stiffening device 42 preferably provide selected inflated side coverage to the interior upper vehicle side structure 22 during initial impact events and subsequent impact events, as described further hereinafter.

The inflator 34 may be of any suitable construction for generating inflation gas to inflate the cushion portion 50 and stiffening device 42. The inflator 34 preferably includes discharge ports (not shown) on one end through which the inflation gas is delivered into the restraint assembly 40. Preferably, the inflator 34 is partially enclosed within the cushion portion 50 for direct delivery of inflation gas into the cushion portion 50 which is in fluid communication with the stiffening device 42. The inflator 34 is preferably shown as having an elongated cylindrical shape, however it will be appreciated that the inflator 34 may also have a disc shape or any other suitable inflator shape. It will further be appreciated that the elongated cylindrical inflator 34 could alternately be turned 90 degrees. The inflator 34 is preferably mounted to the inner sheet metal on the C-pillar 16 and the inflator 34 may partially extend through an access hole in the rear shelf support to be hidden from view from the vehicle interior. However, the inflator 34 may also be mounted in other vehicle locations, such as the A-pillar 14, B-pillar 17, or roof area. It will be appreciated that the inflator 34 could be mounted to the vehicle 10 using a suitable inflator bracket (not shown). It will also be appreciated that while only one inflator 34 is shown, there could be separate inflators for inflating the stiffening device 42 and the cushion portion 50. It will also be appreciated that while the stiffening device 42 and cushion portion 50 are preferably in communication with each other for the use of a single inflator 34, they may alternately not be in fluid communication and be filled by separate inflators.

As shown in the deployed condition in FIG. 1, the cushion portion 50 preferably extends substantially across the upper interior vehicle side structure 22 including covering of the A-pillar 14, B-pillar 17, C-pillar 16, roof rail 15 and side windows 19, 20. The cushion portion 50 includes a rear cushion portion 49 that generally covers the C-pillar 16, a central cushion portion 51 that generally covers the roof rail 15 and B-pillar 17 and front side window 19, and a front cushion portion 52 which generally covers the A-pillar 14. The front cushion portion 52 preferably need not extend over the entire A-pillar 14 since typically the type of side impact event that triggers the inflator 34 in this particular embodiment will not involve forces that direct an occupant towards the forward, lower portion of the A-pillar 14. The rear cushion portion 49 includes an entry portion 53 for directly receiving inflation gas from the inflator 34. Advantageously, the inflatable cushion portions 51, 52, 53 substantially cover the outboard vehicle side structure 22 to prevent occupant interaction with the side structure 22.

As shown in FIG. 3A, the central cushion portion 51 preferably includes internal tethers 58 extending laterally between the inboard panel 24 and the outboard panel 25 for controlling the shape and volume of the central cushion portion 51. Tethers 58 may be included as needed in other parts of the cushion portion 50 for controlling the shape and volume. Advantageously, the tethers 58 should be long enough so that they do not create a flat spot in the cushion portion 50 for maximizing the inflated coverage.

The cushion portion 50 preferably also includes noninflatable portions 54, such as front sheet 55 and rear sheet 56. These noninflatable portions 55, 56 are located in predetermined positions which are not adjacent vehicle side structure 22, such as the A-pillar 14, B-pillar 17, C-pillar 16, or roof rail 15. Advantageously, these noninflatable portions 55, 56 can be used to reduce the volume of inflation gas required to inflate the restraint assembly 40 for quicker full inflation. The noninflatable portions 54 are formed from a single sheet of cushion material as best shown in FIGS. 2A and 2B and as described further below. The noninflatable portions 54 provide lateral stiffness to the entire cushion portion 50 and provide a barrier that can help to retain the head of a restrained vehicle passenger during a primary or secondary event which directs the occupant towards the side of the vehicle 10. Also, the noninflatable portions 54 provide additional lateral stability to the cushion portion 50 when the cushion portion 50 is inflated. Advantageously, the partially inflatable cushion portion 50 having noninflatable portions 54 requires a lesser amount of inflation gas than fully inflatable cushions. Advantageously, the partially inflatable cushion portion 50 can be inflated quickly and efficiently in selected locations such that the cushion portion 50 preferably can provide protection to the interior vehicle side structure 22 in combination with the stiffening device 42. However, it will be appreciated that the entire cushion portion 50 could also be made entirely inflatable without any noninflatable portions and with a separate stiffening device 42 along the lower edge, if desired.

As best shown in FIGS. 2A, 2B, 3A, and 3B, the cushion portion 50 includes an inboard panel 24 and an outboard panel 25. The inboard and outboard panels 24, 25 are preferably made of a coated, woven fabric material typically used for air bag construction. One of the panels, being the outboard panel 25 in this case, forms the rear, central, and front cushion portions 49, 51, 52 in addition to the front and rear sheets 55, 56. The outboard panel 25 may preferably include the stiffening device 42 as a continuation of the cushion material. The cushion material preferably has a coating, such as neoprene and preferably has minimal porosity for holding the inflation gas. The inboard panel 24 is cut to the desired shape of the rear, central, and front cushion portions 49, 51, 52 and the stiffening device 42 and selectively overlays and is attached to the outboard panel 25 to form the inflatable portions of the restraint assembly 40 including the rear, central and front cushion portions 49, 51, 52 and the stiffening device 42.

The stiffening device 42 includes an inboard stiffening wall 43 and an outboard stiffening wall 44 formed by portions of the inboard and outboard panels, 24, 25, respectively. The cushion portion 50 and stiffening device 42 are formed with a plurality of seams 26 for joining the inboard and outboard panels 24, 25. Advantageously, these seams 26 are preferably sealed, such as by some suitable combination of sewing, bonding, spraying, dipping, adhesion, or most preferably by radio-frequency welding so that the gas remains trapped longer in the cushion portion 50 and stiffening device 42 for providing longer-term inflation pressure and for maintaining tension in the stiffening device 42.

As best shown in FIG. 1, the restraint assembly 40 includes the stiffening device 42 that extends longitudinally across the vehicle side structure 22 to provide a lower edge of the restraint assembly 40. The stiffening device 42 has a tubular shape and is preferably positioned inboard of the B-pillar 17 and extends generally between the A-pillar 14 and the C-pillar 16. In this particular embodiment, the tubular stiffening device 42 has an inflated diameter of about 100 mm and is continuously formed with the cushion portion 50 and utilizes the same cushion material and the same outboard and inboard panels 24, 25 as the cushion portion 50. The stiffening device 42 is in fluid communication with the cushion portion 50 and the inflator via the filler portion 60, as described further hereinafter. The tubular stiffening device 42 includes surrounding upper, lower, front, and rear edge portions 81, 82, 83, 84, respectively. The edge portions 81, 82, 83, 84 are positioned outside of the seams 26 such that inflator gas does not leak out through holes 27 positioned around the edge portions 81, 82, 83, 84. The holes 27 are spaced apart and are alternately placed on the upper and lower edge portions 81, 82, with at least one hole 27 on each of the front and rear edge portions 83, 84. The holes 27 are utilized for attachment of a tensioning device 28, as will now be described.

In accordance with the invention, the tensioning device 28 is spiral-wrapped around the stiffening device 42 for providing longitudinal tension and lateral stiffness to the stiffening device 42 and the entire restraint assembly 40 by placement of the stiffening device 42 and tensioning device 28 on the lower edge. The tensioning device 28 of this embodiment is preferably in the form of a cord, but may have any suitable cross-sectional shape that presents a smooth surface for occupant. As best shown in FIGS. 1 and 4, the tensioning strap 28 is passed through holes 27 in the edge portions 81, 82, 83, 84 of the stiffening device 42 in a spiral configuration. The spiral configuration is generally achieved by alternating between holes 27 in the upper and lower edge portions 81, 82. The holes 27 are shown as being spaced evenly apart so that the spiral-wraps 31 have consistent spacing. However, it will be appreciated that the wraps 31 and holes 27 could have uneven spacing and could also be spaced further apart or closer together depending on the exact size and shape of the stiffening device 42 and the amount of tension desired. As best shown in FIGS. 2A, 2B, 3A, and 3B, sealed seam 26 are preferably included both above and below the holes 27 to isolate the holes 27 and for better sealing and reduction of leaks in addition to defining a more definite straight upper edge portion 81 of the stiffening device 42. Furthermore, it will be appreciated that grommets (not shown) or other reinforcements may be used to surround and strengthen the holes 27.

It will be appreciated that the tensioning device 28 is positioned on both the inboard and outboard stiffening walls 43, 44 of the stiffening device 42. The first end 29 of the tensioning device 28 passes through the hole 27 in the front edge portion 83 and is attached to the A-pillar 14. The second end 30 of the tensioning device 28 passes through the hole 27 in the rear edge portion 83 and is attached to the C-pillar 16.

As best shown in FIGS. 1, 2B and 3B, the restraint assembly 40 is preferably assembled as follows. The outboard panel 25 is cut to the overall size and shape of the stiffening device 42 and the cushion portion 50. The inboard panel 24 is cut to the shape of the front, central, and rear cushion portions 52, 51, 49 and the stiffening device 42 and selectively overlies the inner side of the outboard panel 25 and is attached thereto to provide the tubular shape of the stiffening device 42. An upper edge 63 of the cushion portion 50 includes a plurality of apertures for attachment to the vehicle, such as by fasteners 64. The upper edge 63 preferably includes a reinforcement portion 62 as shown in FIGS. 2A and 3A. The fasteners 64, such as those shown in FIGS. 2B and 3B, can be inserted to attach the upper edge 63 of the restraint assembly 40 to the interior vehicle side structure 22, preferably along the A-pillar 14, roof rail 15, and C-pillar 16. Preferably, the inboard and outboard panels 24, 25 are sewn together at seams 26 and suitably bonded to prevent the leakage of inflation gas. It will also be appreciated that the reinforcements (not shown) may be provided along the filler portion 60 and the entry portion 53 for providing strength and protection to the cushion material from forces and heat associated with inflation gas discharge. Preferably, the rear cushion portion 49 near the inflator 34 is reinforced and includes alignable openings (not shown) through which mounting lugs (not shown) from the inflator 34 can extend for attaching the inflator 34 to the C-pillar 16 or other vehicle structure. However, it will be appreciated that many arrangements are possible for mounting the inflator 34 in fluid communication with the entry portion 53 and filler portion 60 and for protecting the cushion portion 50 from heat associated with inflation gas, including the use of a special inflator mounting bracket (not shown).

Prior to deployment, the restraint assembly 40 is preferably stored in a folded condition and many arrangements are possible. For example, the restraint assembly 40 may include the upper edge 63 which is attached to the vehicle 10 at the A-pillar 14, side roof rail 15, and C-pillar 16 at the mounting apertures 64 such as by fasteners 77. The restraint assembly 40 is preferably stored in a folded condition beneath a vehicle molding or a vehicle headliner out of sight until it is deployed. Advantageously, the cushion portion 50 of the restraint assembly 40 includes noninflatable portions 54 that are a single layer of cushion material allowing for a more compact restraint assembly 40 for storage.

Advantageously, the side restraint assembly 40 functions in the following manner. Upon the sensing of a predetermined amount of vehicle side structure acceleration, the inflator 34 is triggered to discharge inflation gas. The entry portion 53 at the rear cushion portion 49 is in fluid communication with the inflator 34 for initial inflation by the inflation gas. Upon deployment, the inflating cushion portion 50 and stiffening device 42 burst open the molding or other housing which stores the restraint assembly 40. As best shown in FIG. 1, the inflation gas from the entry portion 53 forks at the filler portion 60 to simultaneously fill the stiffening device 42. The cushion portion 50 provides initial inflated coverage of a first set of predetermined vehicle locations which are preferably shown as the C-pillar 16, roof rail 15, portions of the A-pillar 14 and portions of the B-pillar 17. In addition, in this inflated condition of the cushion portion 50, the noninflatable portions 54 also provide lateral stability and side restraint, especially for the head of a vehicle occupant.

Simultaneously, the stiffening device 42 inflates with the cushion portion 50. The tensioning device 28 is also deployed with the stiffening device 42. As the stiffening device 42 inflates, the tensioning device 28 develops longitudinal tension due to the spiral wrapping, the increased inflated diameter of the stiffening device 42, and by the attachment of the first and second ends 29, 30 to the vehicle 10. Since the stiffening device 42 is located on a lower edge of the restraint assembly 40, the stiffening device 42 advantageously provides longitudinal and lateral stability to the entire restraint assembly 40. In addition, the stiffening device 42 also provides inflated occupant protection for certain portions of the vehicle 10, such as the B-pillar 17.

Advantageously, the use of a tubular stiffening device 42 made of standard coated fabric cushion material with sealed seams 26 and coupled with the tensioning device 28 provides longitudinal tension, lateral stability, and extended inflation to the restraint assembly 40 without the use of special materials or internal bladders. Advantageously, the use of a longitudinally extending stiffening device 42 provide continuous, extended side protection from the vehicle side structure in combination with the cushion portion 50. Advantageously, the use of an external longitudinal tensioning device 28 does not interfere with or compromise the fully inflatable characteristics of the stiffening device 42.

FIGS. 1, 2A, and 3A show the restraint assembly 40 in the fully inflated condition. Preferably, the entire perimeter of the restraint assembly 40 including all of the seams 26 are sealed shut in a suitable manner, preferably by radio frequency welding, so that inflation gas cannot easily leak out and for sustained inflation of the cushion portion 50 and stiffening device 42. Accordingly, the prolonged inflation of the restraint assembly 40 may make it useful during secondary impact events or rollover events.

It will be understood that a person skilled in the art may make modifications to the preferred embodiment shown herein within the scope and intent of the claims. For example, although the preferred embodiment shows the restraint assembly 40 preferably covering the entire interior vehicle side structure 22 from the C-pillar 16 forward to a portion of the A-pillar 14, it will be appreciated that many other arrangements which provide vehicle interior coverage are possible. For example, the cushion portion 50 could be flipped 180 degrees so that fully inflated coverage is provided over the A-pillar 14 and partial inflated coverage is provided over the C-pillar 16. In addition, the inflator 34 could alternately be mounted in the A-pillar 14 area. As another example, if the inflated coverage of the front cushion portion 51 is extended down the entire A-pillar 14, an inflator 34 could be provided at both the A-pillar 14 and the C-pillar 16 for filling the restraint assembly 40. It will further be appreciated that the restraint assembly 40 could be arranged to cover the rear half of the vehicle 10 from the B-pillar 17 to the C-pillar 16 in which case the stiffening device 42 would extend between the B-pillar and C-pillar 16. Alternately, the restraint assembly 40 could be moved forward to cover the front half of the vehicle 10 from the B-pillar 17 to the A-pillar 14 in which case the stiffening device 42 would extend between the A-pillar 14 and B-pillar 17. Thus, it will be appreciated that many arrangements are possible.

It will also be appreciated that while preferably both are sealed, the cushion portion 50 or the stiffening device 42 or parts thereof could be independently sealed to provide extended inflated coverage to selected vehicle locations, such as the roof rail 15 and pillars 14, 16 or 17.

It will further be appreciated that although the stiffening device 42 is preferably at least one longitudinally extending inflatable tube, there could be more than one stiffening device 42 stacked atop each other or in line with each other and wrapped by one or more tensioning devices 28. While the stiffening device 42 is preferably tubular, it will be appreciated that any generally longitudinally extending shape may be used. It will further be appreciated that there are numerous configurations of the cushion portion 50 depending on the desired area of vehicle coverage.

FIGS. 5–7 show an alternate embodiment of the invention which has a similar description to the embodiment shown in FIGS. 1—4. Similar features having similar descriptions are denoted by similar numerals with a prime (') added. The embodiment shown in FIG. 5 mainly differs in that the tensioning device 28' is wrapped in a zig-zag pattern on the outboard stiffening wall 44' of the stiffening device 42', instead of in a spiral wrap pattern, as described above. Advantageously, the tensioning device 28' does not cover the inboard stiffening wall 43' to prevent occupant interaction with the tensioning device 28'. Also advantageously, this provides greater flexibility in the shape and material of the tensioning device 28', since there is no concern with occupant interaction.

In accordance with this embodiment of the invention, the stiffening device 42' includes an inboard stiffening wall 43' and an outboard stiffening wall 44' formed by portions of the inboard and outboard panels, 24', 25', respectively, of the restraint assembly 40'. The upper cushion portion 50' and stiffening device 42' are formed with a plurality of seams 26' for joining the inboard and outboard panels 24', 25'. These seams 26' are preferably sealed, such as by some suitable combination of sewing, bonding, spraying or dipping, adhesion, or preferably radio frequency welding so that the gas remains trapped longer in the cushion portion 50' and stiffening device 42' for providing longer-term inflation pressure and for maintaining tension in the stiffening device 42'.

As best shown in FIG. 5, the restraint assembly 40' includes the stiffening device 42' that extends longitudinally across the vehicle side portion 11' to provide a lower edge of the restraint assembly 40'. The stiffening device 42' has a tubular shape and is preferably positioned inboard of the B-pillar 17' and extends generally between the A-pillar 14' and the C-pillar 16'. The stiffening device 42' is in fluid communication with the cushion portion 50' and the inflator 34' via the filler portion 60', as described above with regard to FIGS. 1–4. The tubular stiffening device 42' includes surrounding upper, lower, front, and rear edge portions 81', 82', 83', 84', respectively. The edge portions 81', 82', 83, 84' are positioned outside of the seams 26' such that inflator gas does not leak out through holes 27' positioned around the edge portions 81', 82', 83', 84'. The holes 27' are spaced apart and are alternately placed on the upper and lower edge portions 81', 82', with at least one hole 27' on each of the front and rear edge portions 83', 84'. The holes 27' are utilized for attachment of a tensioning device 28', as will now be described.

In accordance with this particular embodiment of the invention, the tensioning device 28' is zig-zag wrapped around the stiffening device 42' for providing longitudinal tension and lateral stiffness to the stiffening device 42'. The tensioning device 28' of this embodiment is preferably in the form of a cord, and may be of a variety cross-sectional shapes and materials as enabled by placement on the outboard stiffening wall 44' of the stiffening device 42'. As shown in FIGS. 5–7, the tensioning strap 28' is passed through holes 27' in the edge portions 81', 82', 83', 84' of the stiffening device 42' in a zig-zag configuration. The zig-zag configuration is generally achieved by alternating between holes 27' in the upper and lower edge portions 81', 82', but only passing over the outboard stiffening wall 44'. The first end 29' of the tensioning device 28' passes through the hole 27' in the front edge portion 83' and is attached to the A-pillar 14'. The second end 30' of the tensioning device 28' passes through the hole 27' in the rear edge portion 83' and is attached to the C-pillar 16'.

The side restraint assembly 40' functions in the following manner. Upon the sensing of a predetermined amount of vehicle side structure acceleration, the inflator 34' is triggered to discharge inflation gas. The entry portion 53' at the rear cushion portion 49' is in fluid communication with the inflator 34' for initial inflation by the inflation gas. Upon deployment, the inflating cushion portion 50' and stiffening device 42' burst open the molding or other housing which stores the restraint assembly 40'. As best shown in FIG. 5, the inflation gas from the entry portion 53' forks at the filler portion 60' to simultaneously fill the stiffening device 42'. The cushion portion 50' provides inflated coverage of a first set of predetermined vehicle locations which are preferably shown as the C-pillar 16', roof rail 15', portions of the A-pillar 14' and portions of the B-pillar 17'. In addition, in this inflated condition of the cushion portion 50', the non-inflatable portions 54' also provide lateral stability and side restraint, especially for the head of a vehicle occupant.

Simultaneously, the stiffening device 42' inflates with the cushion portion 50'. The tensioning device 28' is also deployed with the stiffening device 42'. As the stiffening device 42' inflates, the tensioning device 28' develops longitudinal tension due to the increased inflated diameter of the stiffening device 42', the zig-zag wrapping pattern, and by the attachment of the first and second ends 29', 30' to the vehicle 10'. Since the stiffening device 42' is located on a lower edge of the restraint assembly 40', the stiffening device 42' advantageously provides longitudinal and lateral stability to the entire restraint assembly 40'. In addition, the stiffening device 42' also provides inflated occupant protection for certain portions of the vehicle 10', such as the B-pillar 17'.

FIGS. 8, 9A, and 9B show yet another alternate embodiment of the invention that has a similar description to the embodiment shown in FIGS. 1–4. Similar features having similar descriptions are denoted by similar numerals plus 100 added thereto. The embodiment shown in FIG. 8 mainly differs in that the tensioning device 128 is a braided tubular structure and the stiffening device 142 is an internal tubular bladder located inside the tensioning device 128. Advantageously, this arrangement allows for a more rigid stiffening device 142 that can be inflated to higher pressure levels. One such preferred tensioning device 128 and stiffening device 142 may be similar to that described in U.S. Pat. No. 5,322,322 or U.S. Pat. No. 5,480,181 and assigned to Simula, Inc., hereby incorporated by reference, and in which the braided tube, is preferably made of continuous fibers impregnated with a high elongation, air tight, elastomeric material such as silicone rubber. However, it will be appreciated that other materials are also possible.

In accordance with this embodiment of the invention, the stiffening device 142 is not formed as a continuous portion with the cushion material, but instead is preferably formed separately such that the inboard panel 124 and the outboard panel 125 of the cushion portion 150 do not include and are not continuous with the inboard stiffening wall 143 and the outboard stiffening wall 144. The upper cushion 150 is formed with a plurality of seams 126 for joining the inboard and outboard panels 124, 125. These seams 126 are preferably sealed, such as by some suitable combination of sewing, bonding, spraying or dipping, adhesion, or preferably radio frequency welding so that the gas remains trapped longer in the cushion portion 150 for providing longer-term inflation pressure. In addition, the stiffening device 142 is preferably continuously formed or also has sealed seams such that inflation gas is sustained within the stiffening device 142.

As best shown in FIG. 8, the restraint assembly 140 includes the stiffening device 142 that extends longitudinally across the vehicle side portion 111 to provide a lower edge of the restraint assembly 40. The stiffening device 142 has a tubular shape and is preferably positioned inboard of the B-pillar 117 and extends generally between the A-pillar 114 and the C-pillar 116. The stiffening device 142 is in fluid communication with the cushion portion 150 and the inflator 134 via the filler portion 160. The filler portion 160 may be formed as a strong tubular material and may be made of reinforced cushion fabric material or other suitably strong materials. Unlike the prior embodiments, the tubular stiffening device 142 preferably does not include surrounding upper, lower, front, and rear edge portions, but instead has a smooth section as shown in FIGS. 9A and 9B.

In accordance with this particular embodiment of the invention, the tensioning device 128 is a tightly braided tube that traps and surrounds the stiffening device 142 which is held and supported therein as best shown in FIG. 9A. The tensioning device 128 encompasses and overlies both the inboard and outboard stiffening walls 143, 144.

The tensioning device 128 includes cord-like first and second ends 129, 130, respectively. The second end 130 of the tensioning device 128 is attached adjacent a rear edge of the stiffening device 142 and is anchored to the C-pillar 116. However, the first end 129 of the tensioning device 128 is attached adjacent a front edge of the stiffening device 142 and extends to the A-pillar 114 and wraps around a pulley 190 and is attached to a front edge of the front sheet 155 being one of the noninflatable portions 154. It will be appreciated that the extended first end 129 wrapped around the pulley 190 and connected to the front sheet 155, provides increased longitudinal tension and lateral stability to the upper cushion portion 150 which is mainly detached from the stiffening device 142 as indicated by gap 192 shown in FIG. 8.

The side restraint assembly 140 functions in the following manner. Upon the sensing of a predetermined amount of vehicle side structure acceleration, the inflator 134 is triggered to discharge inflation gas. The entry portion 153 at the rear cushion portion 149 is in fluid communication with the inflator 134 for initial inflation by the inflation gas. Upon deployment, the inflating cushion 150 and stiffening device 142 burst open the molding or other housing which stores the restraint assembly 140. As best shown in FIG. 8, the inflation gas from the entry portion 153 forks at the filler portion 160 to simultaneously fill the stiffening device 142. The cushion portion 150 provides inflated coverage of a first set of predetermined vehicle locations which are preferably shown as the C-pillar 116, roof rail 115, portions of the A-pillar 114 and portions of the B-pillar 117. In addition, in this inflated condition of the cushion portion 150, the noninflatable portions 154 also provide lateral stability and side restraint, especially the front sheet 155 which is attached to the first end 129 of the tensioning device 128 wrapped around pulley 190. Other alterations are possible, such as the stiffening device 142 and filler tube 160 may be an extension of the fabric cushion material, if desired.

FIGS. 10, 11A, and 11B show yet another alternate embodiment of the invention that has a similar description to the embodiment shown in FIGS. 1–4. Similar features having similar descriptions are denoted by similar numerals plus 100 and a prime added thereto. The embodiment shown in FIG. 10 is similar to that shown in FIG. 8 and mainly differs in that the tensioning device 128' and the stiffening device 142' are held in a separate fabric sleeve 195' made of fabric cushion material and overlying the inboard and outboard panels 124', 125' of the cushion portion 150' and also overlying the tensioning device 128'. Similar to FIG. 8, tensioning device 128' of FIG. 10 is preferably a braided tubular structure and the stiffening device 142' is an internal tubular bladder located inside the tensioning device 128'. This embodiment also differs from that shown in FIG. 8 in that the first end 129' of the tensioning device 130' is anchored to the A-pillar 114'. However, it will be appreciated that a pulley as shown at 190 in FIG. 8 could be added such that the first end 129' wraps around it and provides greater lateral stability to the upper cushion portion 150'.

FIGS. 12 and 13 show still a further alternate embodiment of the invention that has a similar description to the embodiment shown in FIGS. 1–4. Similar features having similar descriptions are denoted by similar numerals plus 200 added thereto. The embodiment shown in FIG. 12 mainly differs from that shown in FIGS. 1–4 in that the tensioning device 228 is a mesh material preferably made of a plastic material. The stiffening device 242 continues to be an extension of the fabric cushion material and is located inside the tensioning device 228. The tensioning device 228 may be made of a plastic mesh material similar to that used for produce bags. The mesh material contracts longitudinally as the stiffening device 242 inflates and increases in diameter, similar to the embodiments shown above. The tensioning device 228 preferably includes upwardly extending tab portions 298 that include holes 227 for connecting to the cushion portion 250.

Figure 16:
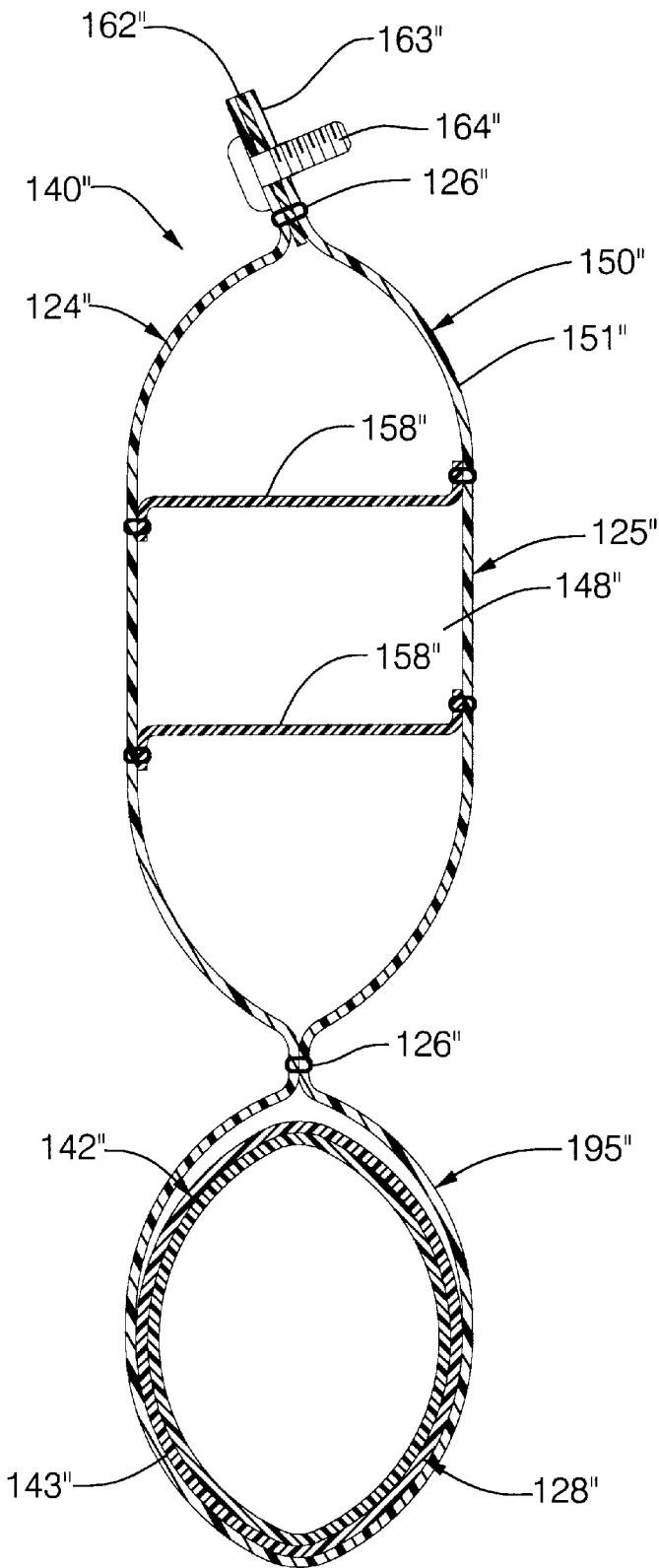
FIG. 16 is a sectional view taken along line 16—16 of FIG. 15.

FIGS. 15–16 show still another alternate embodiment of the invention that has a similar description to the embodiment shown in FIGS. 1–4. Similar features having similar descriptions are denoted by similar numerals plus 100 and a double prime added thereto. The embodiment shown in FIG. 15 is similar to that shown in FIG. 10 and mainly differs in that the fabric sleeve 195" holding the tensioning device 128" and the stiffening device 142" does not surround the upper cushion portion 150", but instead is an extension of the fabric cushion material thereof as best shown in FIG. 16. Thus, less cushion material is required to achieve the same effect of holding the tensioning device 128" and stiffening device 142" in a separate fabric sleeve 195". Similar to FIG. 8, tensioning device 128" of FIG. 15 is preferably a braided tubular structure and the stiffening device 142" is an internal tubular bladder located inside the tensioning device 128". This embodiment also differs from that shown in FIG. 8 in that the first end 129" of the tensioning device 130" is anchored to the A-pillar 114". However, it will be appreciated that a pulley as shown at 190 in FIG. 8 could be added such that the first end 129" wraps around the pulley and provides greater lateral stability to the upper cushion portion 150".

Figure 14:
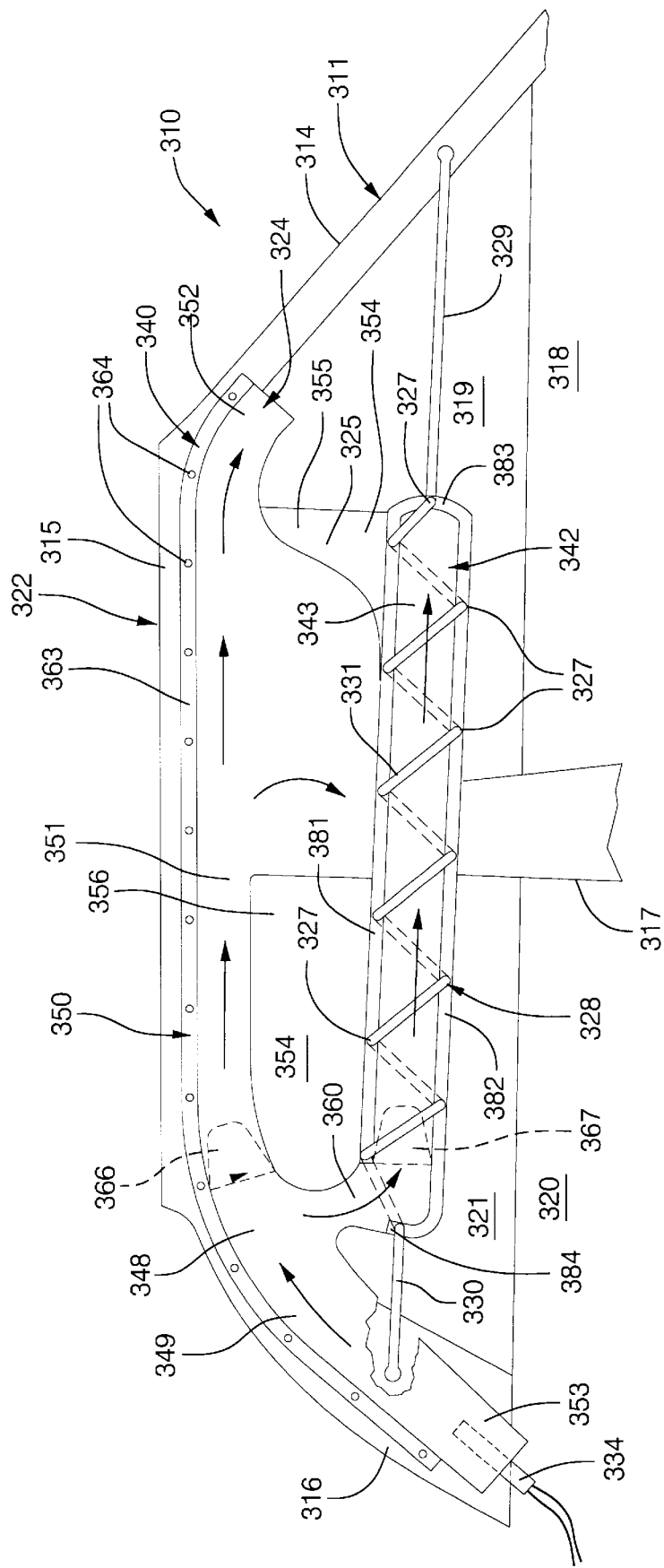
FIG. 14 is a view of an interior vehicle side structure showing still a further alternate restraint assembly in an inflated condition and including check valves for holding inflation gas in the assembly.

FIG. 14 shows still another alternate embodiment of the invention that has a similar description to the embodiment shown in FIGS. 1–4. Similar features having similar descriptions are denoted by similar numerals plus 300 added thereto. The embodiment shown in FIGS. 1–4 mainly differs from that shown in FIGS. 1–4 in that the inflated central cushion portion 351 has a greatly decreased volume that mainly covers the B-pillar 317. The noninflatable portions 354 including front sheet 355 and rear sheet 356 are increased in size and pulled taut by the connected stiffening device 342. A first fabric check valve 366 is located between the rear cushion portion 349 and the central cushion portion 351 for keeping inflation gas trapped longer in the central cushion portion 351. As inflation gas passes through the fabric check valve 366, which is mainly a fabric flap, the back pressure of the filled central cushion portion 351 closes the flap of the valve 366 and helps to retain inflation gas. Preferably, the cushion material and valve 366 are made of a coated material for higher friction. A second check valve 367 is positioned between the filler portion 360 and the stiffening device 342 and operates in a similar manner to retain pressure longer in the stiffening device 342. One such suitable check valve arrangement can be found in US provisional patent application entitled Internal Flap Sealing Head Airbag for Side Impact, serial number not yet received, and assigned to General Motors Corporation and which is hereby incorporated by reference. It will be appreciated that although the tensioning device 328 is shown with a spiral wrap 331 configuration, it will also be appreciated that a zig-zag wrap similar to that in FIGS. 5–7 is also possible.

FIG. 17 shows an even further alternate embodiment of the invention that has a similar description to the embodiment shown in FIGS. 1–4. Similar features having similar descriptions are denoted by similar numerals plus 300 plus a prime added thereto. The embodiment shown in FIG. 17 mainly differs from that shown in FIG. 14 in that the inflated central cushion portion 351' has an increased volume. The noninflatable portion 354' formed by the rear sheet 356' remains, but the front sheet is eliminated. A first fabric check valve 366' is located between the rear cushion portion 349' and the central cushion portion 351' for keeping inflation gas trapped longer in the central cushion portion 351'. As inflation gas passes through the fabric check valve 366', which is mainly a fabric flap, the back pressure of the filled central cushion portion 351' closes the flap of the valve 366' and helps to retain inflation gas. Preferably, the cushion material and valve 366' are made of a coated material for higher friction. A second check valve 367' is positioned between the front cushion portion 352' and the stiffening device 342' and operates is a similar manner to retain pressure longer in the stiffening device 342'. It will be appreciated that the front cushion portion 352' has an additional downwardly extending front fork portion 373' in which the second check valve 367' is located. It will be appreciated that although the tensioning device 328' is shown with a spiral wrap 331' configuration, it will also be appreciated that a zig-zag wrap similar to that in FIGS. 5–7 is also possible.

It will be appreciated that numerous combinations of the features shown above may be used to obtain even further alternate embodiments of the invention. While the present invention has been described as carried out in a specific embodiment thereof, it is not intended to be limited thereby but is intended to cover the invention broadly within the scope and spirit of the appended claims.

What is claimed is:

1. A side restraint assembly for use in a vehicle, the restraint assembly including an inflator for generating inflation gas, the restraint assembly characterized by an upper cushion portion and an inflatable stiffening device extending generally longitudinally across a lower edge of the cushion portion for providing longitudinal tension and lateral stability to the restraint assembly; and a tensioning device being a single strap, and wherein the tensioning device is spiral-wrapped around the stiffening device to form a single, spiral wrap around the stiffening element when the stiffening element is deployed.

2. A side restraint assembly for use in a vehicle, the restraint assembly including an inflator for generating inflation gas, the restraint assembly characterized by an upper cushion portion and an inflatable stiffening device extending generally longitudinally across a lower edge of the cushion portion for providing longitudinal tension and lateral stability to the restraint assembly; and the stiffening device including an inboard stiffening wall and an outboard stiffening wall and wherein the restraint assembly includes a tensioning device, the tensioning device being zig-zag wrapped back and forth across only one of the outboard wall and the inboard wall of the stiffening device.

3. A side restraint assembly for use in a vehicle, the restraint assembly including an inflator for generating inflation gas, the restraint assembly characterized by an upper cushion portion and an inflatable stiffening device extending generally longitudinally across a lower edge of the cushion portion for providing longitudinal tension and lateral stability to the restraint assembly; and the stiffening device including upper and lower edge portions and wherein the restraint assembly includes a tensioning device, the tensioning device alternating passage through the upper and lower edge portions.

* * * * *